US012752305B2

(12) United States Patent
Dörig et al.

(10) Patent No.: US 12,752,305 B2
(45) Date of Patent: Oct. 6, 2026

(54) PLANSIFTER

(71) Applicant: BUHLER AG, Uzwil (CH)

(72) Inventors: Daniel Dörig, Frauenfeld (CH); Remo Friedrich, Winterthur (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 18/880,742

(22) PCT Filed: Jul. 4, 2023

(86) PCT No.: PCT/EP2023/068320
§ 371 (c)(1),
(2) Date: Jan. 2, 2025

(87) PCT Pub. No.: WO2024/008685
PCT Pub. Date: Jan. 11, 2024

(65) Prior Publication Data

US 2026/0001102 A1 Jan. 1, 2026

(30) Foreign Application Priority Data

Jul. 7, 2022 (EP) .................................... 22183577

(51) Int. Cl.
*B07B 1/38* (2006.01)

(52) U.S. Cl.
CPC ............ *B07B 1/38* (2013.01); *B07B 2201/04* (2013.01)

(58) Field of Classification Search
CPC ........ B07B 2201/04; B07B 1/38; B07B 13/16
USPC .......................................................... 209/408
See application file for complete search history.

(56) References Cited

U.S. PATENT DOCUMENTS

2017/0066018 A1* 3/2017 Kunduraci ............ B07B 1/4618

FOREIGN PATENT DOCUMENTS

| | | | | |
|---|---|---|---|---|
| DE | 2 256 307 | A1 | 7/1973 | |
| DE | 2459285 | A1 * | 12/1974 | |
| EP | 1396 289 | A1 | 3/2004 | |
| EP | 4032626 | A1 * | 7/2022 | ............... B07B 1/42 |
| GB | 465 636 | A | 5/1937 | |
| JP | 5 636071 | B1 | 12/2014 | |

OTHER PUBLICATIONS

Zimmermann (DE2459285A1) English Translation (Year: 1974).*

* cited by examiner

*Primary Examiner* — Terrell H Matthews
(74) *Attorney, Agent, or Firm* — Colson Law Group, PLLC

(57) ABSTRACT

A plansifter comprising at least one compartment and a drive module for putting the compartment into a vibrational and/or oscillating movement, wherein in the inner region of the compartment there is provided a sieve stack comprising at least one sieve, preferably 2-32 sieves, more preferably 10 to 32 sieves, especially preferred 20 to 32 sieves, and the compartment has one outlet frame that is provided in the bottom region of the compartment. The present invention is furthermore related to an outlet frame for a plansifter and to a method for sieving material in said plansifter.

17 Claims, 4 Drawing Sheets

PLANSIFTER

The present invention is related to a plansifter that comprises an increased sieve area.

Sieves find widespread application in industrial applications where a separation or sorting of materials according to their particle size is required. As an example, plansifters may be mentioned.

Plansifters for sifting floury or granular products in mills, especially in grain mills, are widely used. An example is the plansifter Sirius MPAK from Bühler. Plansifters have a lockable sieve module (also called compartment herein) with at least one stack of sieve trays arranged one above the other, the mesh size of which can be selected variably throughout the sieve stack in order to sort the product in the desired particle size ranges. To carry out the sieve movement, the plansifter is set in a uniformly oscillating motion by means of an unbalanced drive. Conventionally, said drive is provided in a separate drive module that is arranged in the vicinity of the compartment.

The individual fractions of sieved material that have been separated from each other in the stack of sieve trays are subsequently led into an outlet frame. Said outlet frame is located in the lower part of the inner region of the respective compartment and guides the individual fractions into an appropriate outlet of the sieve module. Said outlet frame is typically made of plastic material such as polyurethane.

In known plansifters, several compartments are usually arranged in an even number in two rows, with a drive module arranged between the two rows, as described for example in DE-2 256 307 A1.

Furthermore, arrangements of two blocks of four sieve modules (compartments) with a drive module in between are known from EPA-396 289 A1.

The plansifters from the state of the art described above are not yet optimal.

The outlet frame in the lower part of the inner region of each compartment consumes valuable space that is thus not available for the provision of additional sieve trays. The design of the outlet frame as a plastic component involves the risk of introducing plastic material into the product stream, which is undesirable. The plastic outlet frame does also not contribute to the structural integrity of the plansifter, since it does not provide necessary mechanical support.

It was the problem of the present invention to provide a plansifter which overcomes the disadvantages of the state of the art described above.

The above problem is solved by the plansifter according to claim 1.

In detail, the present invention is related to a plansifter comprising at least one compartment and a drive module for putting the compartment into a vibrational and/or oscillating movement, wherein said at least one compartment has a framework of outer walls forming a top region, an inner region and a bottom region, wherein in said top region there is provided at least one inlet and in the bottom region there is provided at least one outlet, wherein in the inner region there is provided a sieve stack comprising at least one sieve, preferably 2-32 sieves, more preferably 10 to 32 sieves, especially preferred 20 to 32 sieves, characterized in that the compartment has one outlet frame that is provided in the bottom region.

The present invention is based on the idea to provide the outlet frame not in the inner region of a compartment of the plansifter, but rather in the bottom region thereof. This enables the provision of additional sieves in the inner region of said compartment and advantageously makes use of the bottom region of the compartment.

In the prior art, the top region, inner region and bottom region of a plansifter are distinct regions. The inner region is a hollow space in the compartment, which is separated from the top region and the bottom region by separating walls. In said separating walls, there are openings that lead from the top region into the inner region, and from the inner region into the bottom region. In the hollow space of the inner region, there were provided both a sieve stack and an outlet frame.

The plansifter according to the present invention differs from a conventional plansifter only with respect to the outlet frame. Thus, the plansifter according to the present invention is basically designed as described above. However, the outlet frame is not provided in the hollow space of the inner region, but in the bottom region. According to the present invention, there is preferably no longer a separating wall between the inner region and the bottom region. It is to be understood, however, that the bottom region is still outside the hollow space of the inner region and not a part of the inner space.

The plansifter according to the present invention comprises compartments which act as sieve modules, and in which sieves stacks composed of sieves are provided. According to the present invention, any sieve that is used in a conventional plansifter may be used in the plansifter of the present invention.

The sieve stack is provided in the inner region of each compartment of the plansifter. Said sieve stack comprises at least one sieve, preferably 2-32 sieves, more preferably 10 to 32 sieves, especially preferred 20 to 32 sieves. The design and operation of said sieves is known and is not discussed here in detail.

According to a preferred embodiment of the present invention, the plansifter comprises two rows of compartments, each row consisting of at least one compartment, preferably 2 to 10 compartments. However, other arrangements of the compartments are also possible. According to said preferred embodiment of the present invention, a drive module is arranged between said two rows. Said drive module serves to put the compartment(s) into a vibrational and/or oscillating movement. Preferably, said drive module is composed of at least one drive unit. Preferably, one drive unit is arranged between two compartments and can put these two compartment(s) into a vibrational and/or oscillating movement.

As conventionally known, the plansifter is provided on rods which may be connected, for example to a ceiling of a hall in which the plansifter is arranged. The plansifter is thus cantilevered, which allows the vibrational and/or oscillating movement of the compartment(s).

According to a preferred embodiment of the present invention, the plansifter is designed such that each row has a modular design, so that compartments can be added to or removed from a row.

Each compartment of the plansifter of the present invention has a framework of outer walls forming a top region, an inner region and a bottom region. Preferably, each compartment has a cuboid structure in which said above three regions are provided.

In said top region, there is provided at least one inlet. Said inlet serves for introducing material to be sieved into the compartment. According to the present invention, the number of inlets provided on each compartment is only limited by the available space. Typically, 1 to 5 inlets, preferably 2 to 4 inlets are provided. These inlets may be connected to feed lines through which material can be transported to said compartment. From said top region, the material entering the compartment through the inlets falls into the inner region provided underneath said top region, by gravitational force. In said inner region, the sieve stack described above is provided.

According to a preferred embodiment of the present invention, the compartment(s) comprise a door in the front wall, allowing access to the inner region of the plansifter. This allows inserting and/or replacing sieves into the inner region of the compartment. The door should have such a dimension that when opened sufficient access to the inner region of the compartment is enabled.

In said bottom region, there is provided at least one outlet. Said outlet serves for removing sieved and sorted material out of the compartment. According to the present invention, the number of outlets provided on each compartment is only limited by the available space. Typically, 1 to 10 outlets, preferably 2 to 8, more preferably 3 to 6 outlets are provided. These outlets may be connected to feed lines, such as conveying lines, through which material can be transported away from said compartment.

In a plansifter according to the prior art, the outlet frame is an area in the lower part of the inner region of a compartment in which there are arranged openings which lead to the outlets, as well as channel ramps for guiding the sieved material to the openings. In addition, there are provided (non-inclined) side walls which separate the area into pockets. These components are separate and independent from each other.

In contrast thereto, according to the present invention the outlet frame is arranged in the bottom region of the compartment, i.e. into a region that is separate from the inner region. This gives more space in the inner region of the compartment, which can be used for providing additional sieves (which would otherwise only be possible by increasing the dimensions of the plansifter, which is not desirable). Accordingly, the sieving efficiency of the plansifter of the present invention is improved, as compared to a conventional plansifter.

According to a preferred embodiment of the present invention an outlet frame is provided which consists of one piece in which at least one pocket is provided, said pocket comprising a bottom surface with openings and inclined side walls.

Thus, the present invention is also related to an outlet frame for a plansifter, said outlet frame consisting of one piece, preferably made of a metallic material, wherein said one piece comprises at least one pocket, preferably 2 to 10 pockets, more preferably 3 to 6 pockets, wherein each pocket comprises inclined side walls and an opening in the bottom surface of the pocket, the side walls being inclined towards the opening so that material may be moved over the side walls into the opening.

Preferably, the outlet frame is made of a metallic material, preferably stainless steel. This avoids the use of plastic parts in the plansifter and thus eliminates the risk of any introduction of plastic material into the product stream, thus increasing the hygiene properties of the plansifter of the present invention. Moreover, an outlet frame of a metallic material typically has a longer service-life than an outlet frame of a plastic material. Finally, the metallic outlet frame of the present invention provides for an improved recyclability.

Furthermore, by providing an outlet frame of a solid and rigid material in the bottom region of the compartment, the structural support of the compartment is increased. With said outlet frame of preferably stainless steel in place, the bottom region of the compartment becomes more rigid.

According to a preferred embodiment of the present invention, the outlet frame is a deep-drawn part, preferably a deep-drawn metal sheet.

Deep-drawing is a known technique for preparing metal parts of a desired shape and does not have to be discussed here in detail. With deep-drawing, preparation of a one-piece outlet frame according to the present invention with pockets is efficiently possible.

According to another preferred embodiment of the present invention, the outlet frame is made by additive manufacturing. In additive manufacturing, data computer-aided-design (CAD) software or 3D object scanners are used to direct hardware to deposit material, preferably layer upon layer, in precise geometric shapes. A preferred variant of additive manufacturing is 3D printing. Additive manufacturing and the materials used in additive manufacturing are known.

The outlet frame according to a preferred embodiment of the present invention comprises at least one pocket, preferably 2 to 10 pockets, more preferably 3 to 6 pockets. These pockets are intended for taking up fractions of the material that is sieved in the sieve stack of the respective compartment of the plansifter of the present invention. As is known, a sieve stack of a plansifter is composed of vertically arranged sieves having different mesh sizes, wherein typically the mesh size of the sieves decreases from the top to the bottom of a sieve stack. Material having a particle size that is smaller than the mesh size of a respective sieve falls through the sieve onto a collecting tray from which it is conveyed by the vibrational and/or oscillatory movement of the sieve during operation with support of the oscillatory movement of sieve cleaners in between the sieve and the collecting tray to an outlet at a side of the sieve, from which it is led to a pocket of the outlet frame or back inside the sieve stack at a later point, whereas particles having a particle size that is larger than the mesh size of a respective sieve is conveyed by the vibrational and/or oscillatory movement of the sieve during operation to a sieve outlet at a side of the sieve, from which it is led to a pocket of the outlet frame or back inside the sieve stack at a later point. By repeated separation of the material on different sieves, different material fractions are obtained which are led to separate pockets of the outlet frame of the present invention, for example with the aid of lines arranged in the plansifter.

In a preferred embodiment of the outlet frame of the present invention, each pocket comprises inclined side walls and an opening in the bottom surface of the pocket, the side walls being inclined towards the opening so that material may be moved over the side walls into the opening. Material entering the pocket from above is therewith transferred to the opening in the bottom surface of the pocket. Each opening in a pocket of the outlet frame, when installed in a plansifter of the present invention, is fluidly connected to an outlet in the bottom region of the plansifter. Thus, the material is reliably transferred through the openings in the outlet frame and the outlets of the compartment out of the plansifter. Outside the compartment, the material may be transported away from the plansifter, for example by known conveying means.

According to a preferred embodiment of the present invention, an insulation is provided outside, preferably glued to, the bottom surface and/or the inclined side walls of the outlet frame. Any material capable of insulating the outlet frame from environmental conditions such as temperature of humidity may be used for this purpose. Preferably, the insulation is provided in the form of a layer, more preferably an injection-molded layer.

According to a preferred embodiment of the present invention, the outlet frame is mechanically fixed, preferably releasably fixed, in the bottom region of the compartment. More preferably, said mechanical fixation is provided by screw joints, preferably by eight screw joints arranged in the four corners of the bottom region. Preferably, said bottom region is made from a metal such as cast iron.

Especially when the one-piece outlet frame described above is used, this fixation provides for an increased structural support in the bottom region of the compartment. The bottom region has an increased stiffness, wherein the mechanically fixed outlet frame is mechanically loaded. This leads also to a reduction of the weight of the plansifter, since the mechanically fixed outlet frame replaces other portions that would otherwise be required for taking up mechanical load.

With the plansifter according to the present invention, different types of materials can be sieved. For example, floury or granular products such as grains may be mentioned. However, also sugars or chemical substances can be well sieved in the plansifter according to the present invention.

The present invention is also related to a method for sieving material in a plansifter described above, comprising the steps:

a) Introducing material to be sieved into an inlet of a compartment of the plansifter,
b) Sieving the material using a sieve stack provided in the inner region of said compartment,
c) Removing the sieved material through an outlet frame provided in the bottom region of said compartment and an outlet of said compartment.

Details of said method have already been explained above.

There is a difference between sieving and sifting. In a sieving process, particles are separated from one another strictly due to their different particle sizes, allowing smaller particles to protrude through sieve openings of a certain size, whereas larger particles are held back by the sieve. In a sifting process, particles are separated from one another based on their size, shape and density, using the stratification on the sieve mesh due to the circular movement of the sieve and the product flow.

Preferably, the material is removed in step c) by moving downward over inclined side walls of at least one pocket of said outlet frame to an opening in the bottom surface of the pocket of the outlet frame, the side walls being inclined towards the opening so that material is moved over the side walls into the opening.

The present invention will hereinafter be explained in more detail by reference to non-limiting examples and drawings.

In the drawings, the same reference numbers denote the same components.

Figure 1:
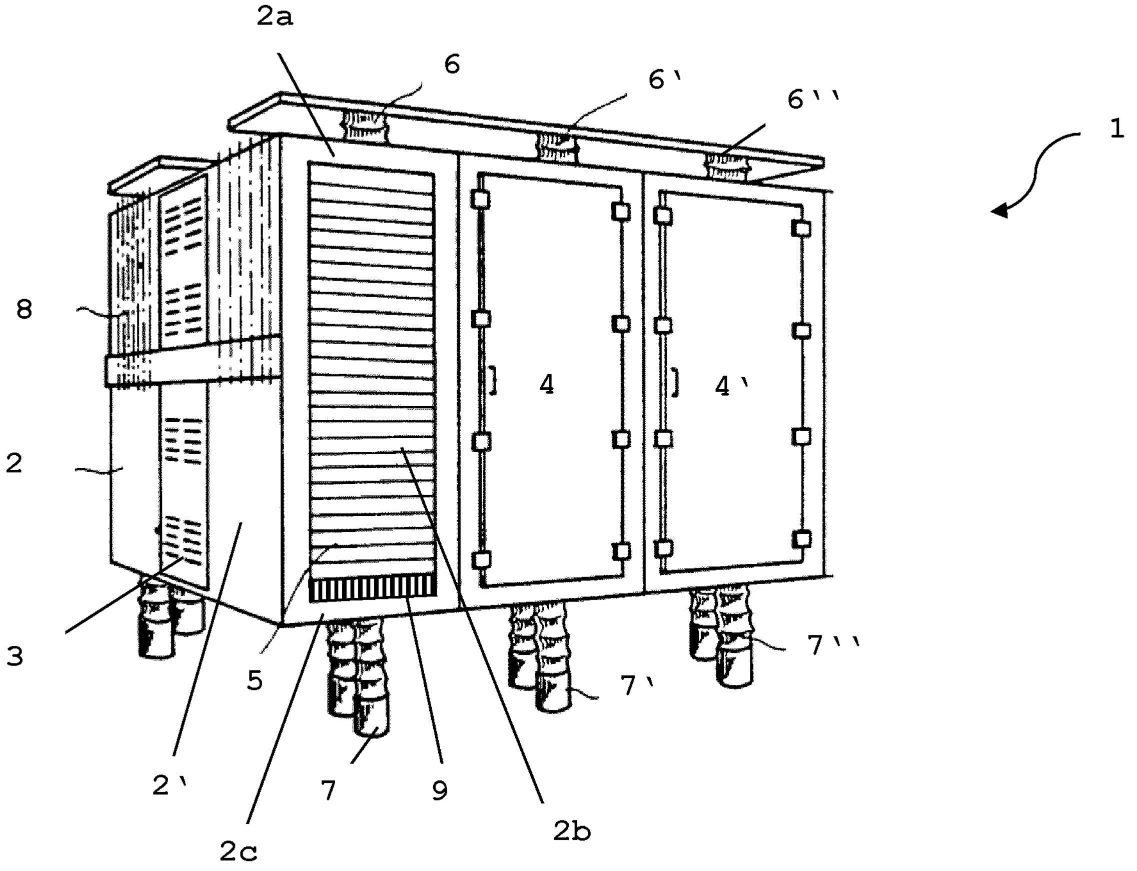
Fig. 1 (prior art)
FIG. 1 shows a perspective view of a plansifter according to the prior art

In FIG. 1, an embodiment of a plansifter 1 from the prior art is shown. The plansifter 1 comprises compartments 2, 2' acting as sieve modules. In the embodiment of FIG. 1, two rows of compartments 2, 2' are provided, wherein each row is composed of three compartments 2, 2'. Between these rows of compartments 2, 2', there is arranged a drive module 3. In the embodiment of FIG. 1, two compartments 2, 2' can be put into vibrational or oscillatory movement by means of a drive unit arranged between them.

Each compartment 2, 2' comprises a top region 2_a_, an inner region 2_b_ and a bottom region 2_c_, which are separate from one another, and is equipped with a door 4, 4'. In FIG. 1, for illustration purposes one door 4 is removed from a compartment 2', so that an entire sieve stack 5 arranged in the inner region 2_b_ of said compartment 2' is visible.

In the plansifter 1, the sieve stack 5 comprises sieve frames equipped with insert frames, as conventionally known. The number of sieves that can be provided over the height of the inner region of the plansifter 1 is limited due to the presence of an outlet frame 9 in the lower part of the inner region 2_b_ of the compartment 2, 2'.

The plansifter 1 has a swing drive (not shown) in the drive module 3 which imposes a circular motion on all the sieves in the compartments 2, 2'. For this purpose, the plansifter 1 is suspended as a cantilever on rods 8.

The material is fed to the sieve stacks 5 in the compartments 2, 2' via inlets 6, 6', 6''' provided in the top region 2_a_ of each compartment 2, 2', and the sorted material is discharged via outlets 7, 7', 7''' provided in the bottom region 2_c_ of each compartment 2, 2'. In the embodiment of FIG. 1, one inlet 6, 6', 6''' and two outlets 7, 7', 7''' are attributed to each compartment 2, 2'. It is understood, however, that the number of inlet ports and outlet ports attributed to each compartment 2, 2' may be adjusted if desired or necessary.

Figure 2:
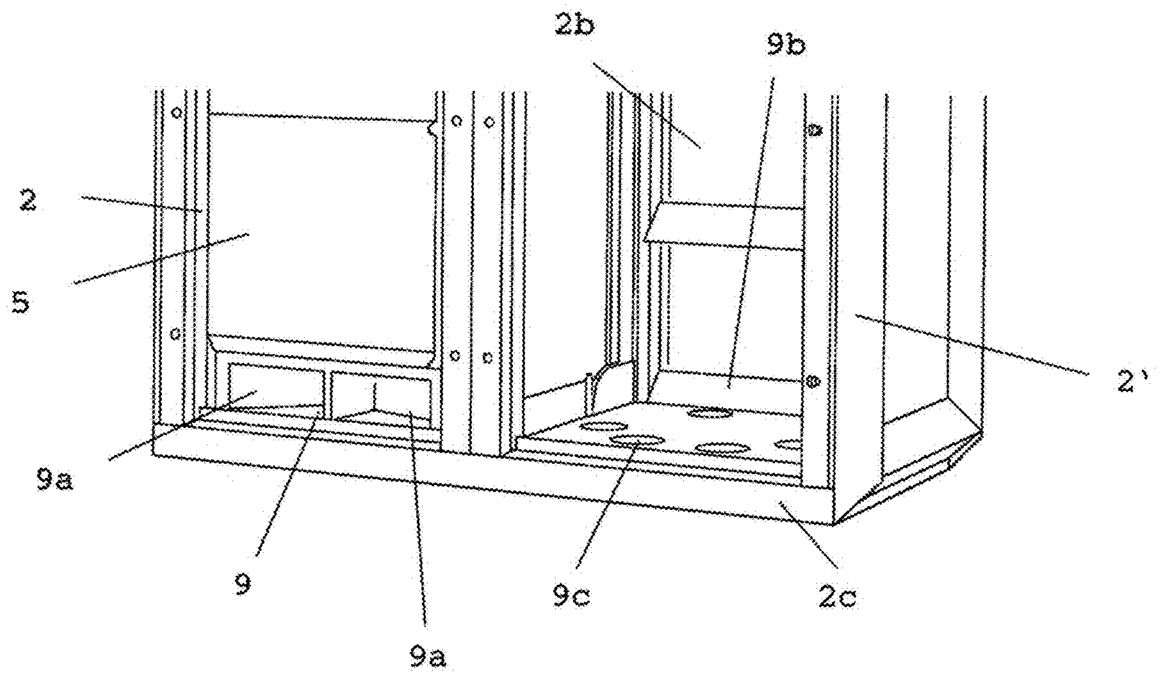
Fig. 2 (prior art)
FIG. 2 shows the lower part of a compartment of a plansifter according to the prior art

FIG. 2 shows the lower part of two compartment 2, 2' of the plansifter 1 from the prior art according to FIG. 1. In the left compartment 2, there is arranged a sieve stack 5 in the inner region of the compartment 2. Moreover, in the inner region 4 of the compartment 2, there is also arranged an outlet frame 9, below the sieve stack 5. Said outlet frame 9 comprises pockets 9_a_, which open into the openings 9_c_, which are connected to outlets 7, 7', 7''' (not shown in FIG. 2). Furthermore, as can be best seen in the right compartment 2' (where no sieve stack 5 and no outlet frame 9 is inserted into the inner region 2_b_ of said compartment 2'), channel ramps 9_b_ are provided which serve for guiding the sieved material into the openings 9_c_. As can be seen in FIG. 2, the bottom region 2_c_ of each compartment 2, 2' only provides the openings 9_c_. The bottom region 2_c_ is separate from the inner region 2_b_ (which provides a hollow space for insertion of the sieve stack 5).

Figure 3:
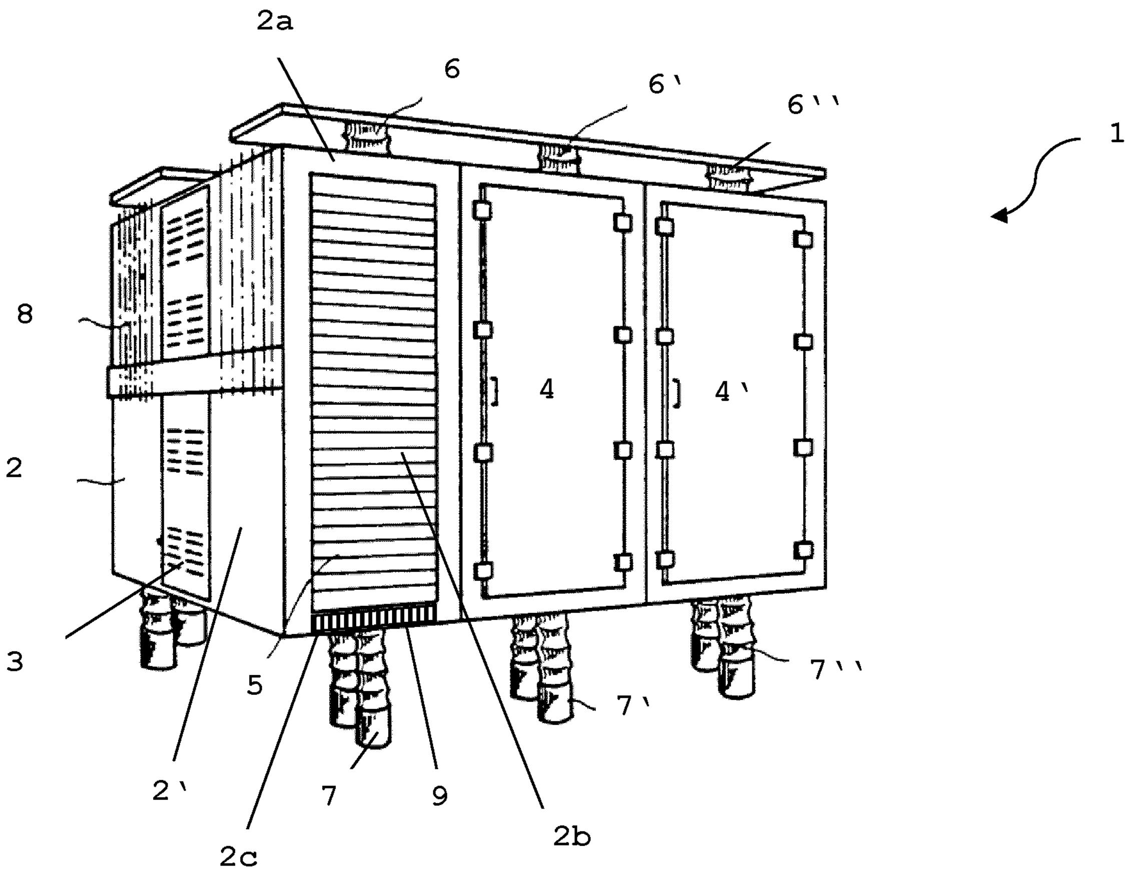
FIG. 3 shows a perspective view of an embodiment of a plansifter according to the present invention

FIG. 3 shows an embodiment of a plansifter 1 according to the present invention. As compared to the plansifter from the prior art according to FIG. 1, the outlet frame 9 is now provided in the bottom region 2_c_ of each compartment 2, 2', instead of being provided in the inner region 2_b_ thereof. Also here, the bottom region 2_c_ is separate from the inner region 2_b_. In the bottom region 2_c_, no sieves can be provided. However, since the hollow space of the inner region 2_b_ no longer has to take up the outlet frame 9, there is free space for inserting additional sieves into the inner region 2_b_.

Figure 4:
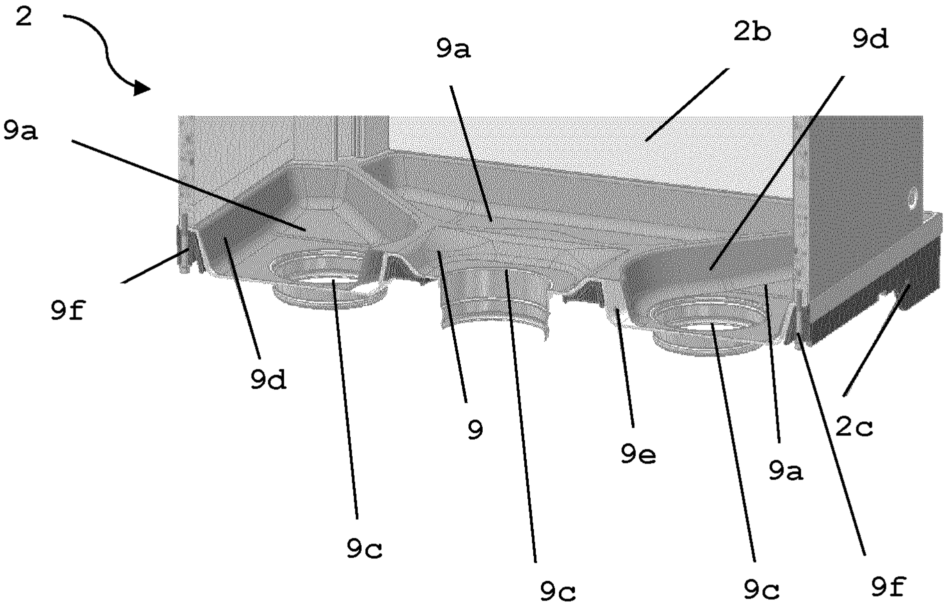
FIG. 4 shows an embodiment of an outlet frame according to the present invention in a plansifter.

FIG. 4 shows the bottom region 2_c_ of the plansifter 1 according to the present invention (as shown in FIG. 3) in more detail. The outlet frame 9 is provided in the bottom region 2_c_ of the compartment 2. Thus, the inner region 2_b_ does not comprise said outlet frame 9 and can house more sieves.

Preferably, the outlet frame 9 is made of a metallic material such as stainless steel, so as to provide structural support to the plansifter.

The outlet frame 9 comprises pockets 9*a* into which sieved material is introduced. The pockets 9*a* each comprise an opening 9*c* in their bottom surfaces. Said openings 9*c* are in communicating connection with outlets 7, 7', 7''' (shown in FIG. 3) of the compartment 2, so that sieved and sorted material exits the compartment 2 through said openings 9*c* and outlets 7, 7', 7''' (shown in FIG. 3).

Each pocket 9*a* comprises inclined side walls 9*d* that guide sieved material entering a pocket 9*a* to the respective opening 9*c* in the bottom surface of the pocket 9*a*.

In the embodiment of FIG. 4, an insulation 9*e* is provided underneath the bottom surface and/or the inclined side walls 9*d*. Preferably, said insulation to glued to the outlet frame 9. In the embodiment of FIG. 4, the outlet frame 9 consists of one piece, preferably of a metallic material, more preferably stainless steel. Especially preferred, the one-piece outlet frame (9) is a deep-drawn part, preferably a deep-drawn metal sheet.

As shown in FIG. 4, the outlet frame 9 is provided with screws 9*f* for securing the side walls 9*d* to the bottom region 2*c* of the compartment 2, 2'. Furthermore, but not displayed in FIG. 4, said outlet frame 9 is mechanically fixed, preferably releasably fixed, to the bottom region 2*c* of the compartment 2, 2' by screw joints, preferably by eight screw joints arranged in the four corners of the bottom region 2*c* of the compartment 2, 2'.

The invention claimed is:

1. A plansifter comprising at least one compartment and a drive module for putting the compartment into a vibrational and/or oscillating movement, wherein said at least one compartment has a framework of outer walls forming a top region, an inner region and a bottom region, wherein in said top region there is provided at least one inlet and in the bottom region there is provided at least one outlet, wherein the inner region there is provided a sieve stack comprising at least one sieve, wherein the compartment has one outlet frame that is provided in the bottom region.

2. The plansifter according to claim 1, the outlet frame made of a metallic material, preferably stainless steel.

3. The plansifter according to claim 2, wherein the outlet frame is a deep-drawn part, preferably a deep-drawn metal sheet.

4. The plansifter according to claim 1, wherein the outlet frame comprises at least one pocket.

5. The plansifter according to claim 4, wherein each pocket comprises inclined side walls and an opening in the bottom surface of the pocket, the side walls being inclined towards the opening so that material may be moved over the side walls into the opening.

6. The plansifter according to claim 5, wherein each opening in a pocket of the outlet frame is fluidly connected to an outlet in the bottom region of the plansifter.

7. The plansifter according to claim 1, wherein an insulation is provided outside, preferably glued to, the bottom surface and/or the inclined side walls of the outlet frame.

8. The plansifter according to claim 1, wherein the outlet frame is mechanically fixed, preferably releasably fixed, in the bottom region of the compartment.

9. The plansifter according to claim 8, wherein said mechanical fixation is provided by screw joints, preferably by eight screw joints arranged in the four corners of the bottom region of the compartment.

10. The plansifter according to claim 1, wherein the plansifter comprises two rows of compartments, each row consisting of at least one compartment, preferably 2 to 10 compartments, wherein said drive module is arranged between said two rows.

11. The plansifter according to claim 10, wherein each row has a modular design, so that compartments can be added to or removed from a row.

12. The plansifter according to claim 1, wherein said at least one compartment comprises a door in the front wall, allowing access to the inner region of the plansifter.

13. An outlet frame for a plansifter, said outlet frame consisting of one piece, preferably made of a metallic material, wherein said one piece comprises at least one pocket, preferably 2 to 10 pockets, more preferably 3 to 6 pockets, wherein each pocket comprises inclined side walls and an opening in the bottom surface of the pocket, the side walls being inclined towards the opening so that material may be moved over the side walls into the opening.

14. A method for sieving material in a plansifter according to claim 1, comprising the steps:

a) introducing material to be sieved into an inlet of a compartment of the plansifter, b) sieving the material using a sieve stack provided in the inner region of said compartment, c) removing the sieved material through an outlet frame provided in the bottom region of said compartment and an outlet of said compartment.

15. The method according to claim 14, the material is removed in step c) by moving downward over inclined side walls of at least one pocket of said outlet frame to an opening in the bottom surface of the pocket of the outlet frame, the side walls being inclined towards the opening so that material is moved over the side walls into the opening.

16. The plansifter according to claim 1, wherein the sieve stack comprises:

2-32 sieves; 10 to 32 sieves; or, 20 to 32 sieves.

17. The plansifter according to claim 1, wherein the outlet frame comprises:

2 to 10 pockets; or, 3 to 6 pockets.

* * * * *